United States Patent
Xu et al.

(10) Patent No.: US 10,618,043 B2
(45) Date of Patent: Apr. 14, 2020

(54) METHOD FOR PREPARING SUPPORTED CATALYST FOR HETEROGENEOUS CATALYTIC OZONATION

(71) Applicant: Nanjing University, Nanjing (CN)

(72) Inventors: Ke Xu, Nanjing (CN); Shuhan Wen, Nanjing (CN); Hongqiang Ren, Nanjing (CN); Jinju Geng, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 388 days.

(21) Appl. No.: 15/710,807

(22) Filed: Sep. 20, 2017

(65) Prior Publication Data
US 2018/0264457 A1  Sep. 20, 2018

(30) Foreign Application Priority Data
Mar. 14, 2017 (CN) .......................... 2017 1 0151083

(51) Int. Cl.
| | |
|---|---|
| *B01J 37/04* | (2006.01) |
| *B01J 37/08* | (2006.01) |
| *B01J 37/06* | (2006.01) |
| *B01J 21/16* | (2006.01) |
| *B01J 37/34* | (2006.01) |
| *B01J 21/00* | (2006.01) |
| *B01J 35/02* | (2006.01) |

(Continued)

(52) U.S. Cl.
CPC ............. *B01J 37/04* (2013.01); *B01J 21/005* (2013.01); *B01J 21/16* (2013.01); *B01J 23/005* (2013.01); *B01J 23/34* (2013.01); *B01J 35/023* (2013.01); *B01J 35/026* (2013.01); *B01J 35/08* (2013.01); *B01J 37/06* (2013.01); *B01J 37/08* (2013.01); *B01J 37/343* (2013.01); *B01J 37/346* (2013.01); *C02F 1/725* (2013.01); *C02F 1/78* (2013.01)

(58) Field of Classification Search
CPC ........ B01J 21/005; B01J 21/16; B01J 23/005; B01J 23/34; B01J 35/023; B01J 35/026; B01J 35/08; B01J 37/04; B01J 37/06; B01J 37/08; B01J 37/343; B01J 37/346; C02F 1/725; C02F 1/78
See application file for complete search history.

(56) References Cited

U.S. PATENT DOCUMENTS

2017/0001176 A1* 1/2017 D'Souza ................... C01B 3/40

* cited by examiner

*Primary Examiner* — Amber R Orlando
*Assistant Examiner* — Syed T Iqbal
(74) *Attorney, Agent, or Firm* — Matthias Scholl P.C.; Matthias Scholl

(57) ABSTRACT

A method for preparing a catalyst, including: 1) uniformly mixing attapulgite, lithium-manganese spinel (Li—Mn spinel), manganese dioxide powders to form mixed raw material; adding water to the mixed raw material; stirring and mixing the mixed raw material and the water for between 5 and 15 min to yield a reaction mixture; 2) feeding the reaction mixture in 1) to a pelletizer to prepare spherical particles or hollow cylindrical particles; drying the spherical particles or the hollow cylindrical particles to yield a precursor; 3) heating the precursor in a muffle furnace, and calcining the precursor to yield a crude catalyst; 4) mixing the crude catalyst with an acid solution; alternating between ultrasound and microwave to wash the crude catalyst; and 5) washing the crude catalyst in 4) with water; and drying the catalyst for 12 hrs in air at 105° C.

7 Claims, 2 Drawing Sheets

(51) Int. Cl.
*B01J 35/08* (2006.01)
*B01J 23/00* (2006.01)
*C02F 1/78* (2006.01)
*C02F 1/72* (2006.01)
*B01J 23/34* (2006.01)

METHOD FOR PREPARING SUPPORTED CATALYST FOR HETEROGENEOUS CATALYTIC OZONATION

CROSS-REFERENCE TO RELATED APPLICATIONS

Pursuant to 35 U.S.C. § 119 and the Paris Convention Treaty, this application claims foreign priority to Chinese Patent Application No. 201710151083.8 filed Mar. 14, 2017, the contents of which are incorporated herein by reference.

BACKGROUND OF THE INVENTION

Field of the Invention

The invention relates to a method for preparing a supported catalyst for heterogeneous catalytic ozonation.

Description of the Related Art

Catalysts for ozonation include homogeneous catalysts and heterogeneous catalysts. The homogeneous catalysts include metal ions, while the heterogeneous catalysts include solid elemental metals or metal oxides. The homogeneous catalysts are difficult to recycle and cause secondary pollution.

In general, the solid heterogeneous catalysts are loaded on supports including activated carbon, zeolite, graphite; however, theses supports are expensive and have relatively small specific surface area, and the activity of the resultant catalyst is low.

SUMMARY OF THE INVENTION

In view of the above-described problems, it is one objective of the invention to provide a method for preparing a supported catalyst for heterogeneous catalytic ozonation. The support for the catalyst is inexpensive, it has a relatively large specific surface area, and the prepared catalyst exhibits a relatively high activity.

To achieve the above objective, in accordance with one embodiment of the invention, there is provided a method for preparing a supported catalyst for heterogeneous catalytic ozonation, the method comprising:

1) uniformly mixing attapulgite, lithium-manganese spinel (Li—Mn spinel), manganese dioxide powders to form mixed raw material; adding water to the mixed raw material, where, a weight ratio of the attapulgite to the Li—Mn spinel to the manganese dioxide powders and to the water is 100:1-3:1-20:80-90; stiffing and mixing the mixed raw material and water for between 5 and 15 min to yield a reaction mixture;

Critically, the attapulgite must be uniformly mixed with the manganese dioxide, the uneven mixing results in bad quality and properties of the supported catalyst.

The water is used as a binder, so that no waste gas is produced in the calcining process, thus protecting the environment; however, when the weight ratio of the binder (water) is higher than or lower than the range above, the shaping or granulation of the catalyst becomes difficult.

When the amount of the manganese dioxide powders is out of the range above, the shaping or granulation of the catalyst also becomes difficult, meanwhile, the mechanical strength thereof is low.

2) feeding the reaction mixture in 1) to a pelletizer to prepare spherical particles or hollow cylindrical particles; a diameter of the spherical particles being between 3 and 4 mm; drying the spherical particles or the hollow cylindrical particles in a drying oven for between 0.5 and 2.5 hr(s) at 105° C. in air to yield a precursor;

3) heating the precursor prepared in 2) to a temperature between 400 and 1000° C. at a rate of 200° C./h in a muffle furnace, and calcining the precursor for between 2 and 24 hrs to yield a crude catalyst with certain mechanical strength; where, the objectives of the calcining are: 1. removing molecular water and crystal water in the precursor and improving the strength of the catalyst to form porous catalyst pellet; 2. activating the manganese dioxide to catalytic manganese dioxide powders;

4) mixing the crude catalyst prepared in 3) with an acid solution, and a weight ratio of the catalyst to the acid solution is 10:50; alternating between ultrasound and microwave to wash the crude catalyst for 30 min to activate the crude catalyst and form pores; and 5) washing the crude catalyst in 4) using water until a pH value of a resulting washing solution is constant; drying the crude catalyst for 12 hrs in air at 105° C. to remove molecular water in the catalyst and yield the catalyst.

In a class of this embodiment, in 1), the attapulgite, the lithium-manganese spinel (Li—Mn spinel), the manganese dioxide powders, and the water are uniformly mixed and stirred for 15 min to form the mixed raw material, and a weight ratio of the attapulgite to the Li—Mn spinel to the manganese dioxide powders and to the water is 100:2:20:85.

In a class of this embodiment, in 2), the reaction mixture in 1) is fed in the pelletizer to prepare the spherical particles, and the diameter thereof is 4 mm. The spherical particles are placed in the drying oven and dried for 2 hrs at 105° C. in air to yield the precursor.

In a class of this embodiment, in 3), the precursor prepared in 2) is heated to 1000° C. at a rate of 200° C./h in the muffle furnace, and is calcined for 2 hrs to yield the catalyst with certain mechanical strength;

In a class of this embodiment, in 2), the reaction mixture in 1) is fed to the pelletizer to prepare the hollow cylindrical particles. An inner diameter of the hollow cylindrical particles is 1 mm, and an outer diameter of the hollow cylindrical particles is 4 mm. A cylindrical core is filled with the hollow cylindrical particles, and the cylindrical particles are placed in the drying oven and dried for 2 hrs at 105° C. in air to yield the precursor.

In a class of this embodiment, the cylindrical core is a mixture of titanium dioxide, cerium oxide, and attapulgite, and a weight ratio of the titanium dioxide to the cerium oxide and the attapulgite is 3:1:6. The cylindrical core is prepared by calcining the mixture of the titanium dioxide, the cerium oxide, and the attapulgite.

In a class of this embodiment, particle size of the Li—Mn spinel is between 50 and 200 nm.

In a class of this embodiment, the acid solution comprises hydrochloric acid, $SnCl_4 \cdot 5H_2O$, acetic acid, and water and a molar ratio thereof is 1:1:2-4:10-15.

In a class of this embodiment, a specific process of the acid washing is: the catalyst is washed under ultrasonic condition for between 3 and 5 min, then the acid washing is switched to microwave radiation, and radiated for between 1 and 2 min, and the above process is repeated. The ultrasonic power is between 25 and 80 KHz, and the microwave power is between 2 and 50 W. The supported catalyst prepared using the method features large specific surface area and high catalytic activity, and is low-cost to produce. The production process emits no waste gas, and has no metal ion leaching, thus the method and the catalyst are green and environmentally friendly, and suitable for large-scale application.

Advantages of the method according to embodiments of the invention are summarized as follows:

1. The attapulgite is abundant in nature, and is cheap and readily available. Meanwhile, the attapulgite is characterized by large specific area, plentiful pores, high mechanical strength, and low possibility of being oxidized, thus when the attapulgite is used as the catalytic support of the catalyst for heterogeneous catalytic ozonation, the supported catalyst is low-cost, and features large specific surface area and high catalytic activity.

2. The supported catalyst prepared using the method facilitates the generation of hydroxyl radical from ozone, thus increases the mineralization rate of pollutants, and accelerates the degradation rate of the pollutants.

3. The method uses water as the bonder, and no other organic binder is used, meanwhile the calcining process and acid washing process produce no waste gas, thus the method is economical and environmentally friendly.

4. The supported catalyst is spherical particles or hollow cylindrical particles. The diameter of the spherical particles is between 3 and 4 mm. Solid-liquid separation can be easily realized. The cylindrical particles filled with cylindrical cores feature a porous shell, and the catalytic efficiency is high, thus the catalyst is applicable to the advanced treatment of industrial sewage.

5. The service life of the supported catalyst prepared using the method is relatively long, and when the catalytic efficiency decreases after a long reaction, the supported catalyst can be recycled, thus further reducing the cost.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method for preparing a supported catalyst for heterogeneous catalytic ozonation are described below. It should be noted that the following examples are intended to describe and not to limit the invention.

Example 1

Figure 1:
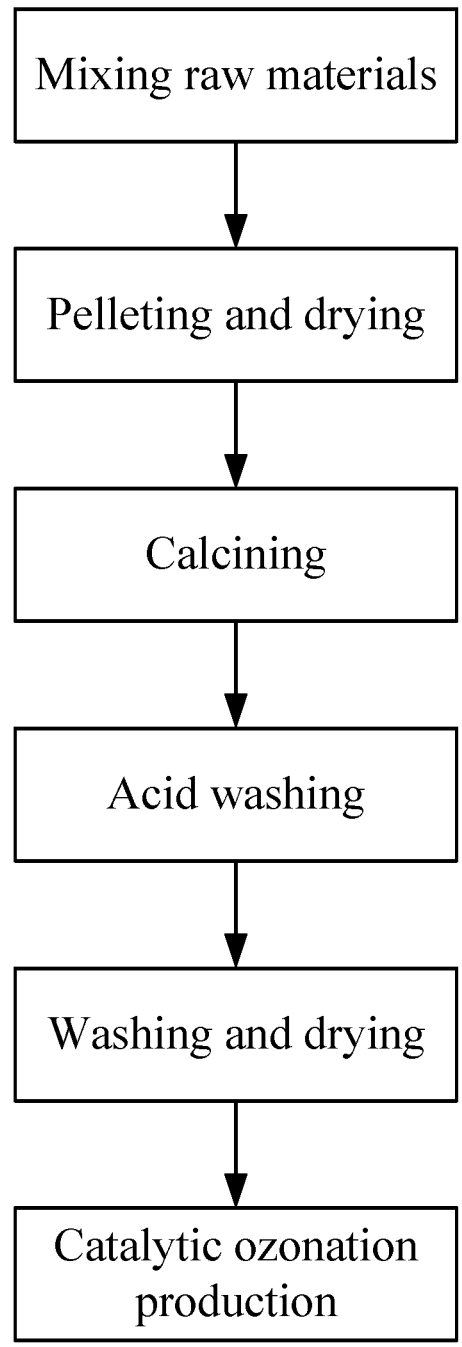
FIG. 1 is a flow chart of a method for preparing a supported catalyst for heterogeneous catalytic ozonation according to one embodiment of the invention.

As shown in FIG. 1, a method for preparing a supported catalyst for heterogeneous catalytic ozonation comprises the following steps:

1) Ingredient: attapulgite, lithium-manganese spinel (Li—Mn spinel), and manganese dioxide powders were mixed uniformly to form mixed raw material. Water was added to the mixed raw material, and a weight ratio of the attapulgite to the Li—Mn spinel to the manganese dioxide powders and to the water is 100:1:1:80. The mixed raw material and water were stirred and mixed for 15 min to yield a reaction mixture. Particle size of the Li—Mn spinel is 50 nm.

The attapulgite was evenly mixed with the commercial manganese dioxide, or an uneven mixing results in bad quality and uneven performance of the supported catalyst.

Water was used as a binder, so that no waste gas was produced in the calcining process, thereby protecting the environment. However, when the weight ratio of the binder (water) is higher than or lower than the range above, the catalyst is difficult to be shaped or granulated.

When the amount of the manganese dioxide powders is out of the range above, the catalyst is difficult to be shaped or granulated as well, meanwhile, the mechanical strength thereof is low.

2) Pelleting and drying: the reaction mixture in 1) was fed to a pelletizer to prepare spherical particles. A diameter of the spherical particles was 3 mm. The spherical particles were moved to a drying oven and dried for 0.5 hr at 105° C. in air to yield a precursor.

3) Calcining and drying: the precursor prepared in 2) was heated to 400° C. at a rate of 200° C./h in a muffle furnace, and the precursor was calcined for 2 hrs to yield a catalyst with certain mechanical strength.

The two objectives of the calcining are: 1. removing molecular water and crystal water in the precursor and improving the strength of the catalyst to form porous catalyst pellet; 2. activating the commercial manganese dioxide to catalytic manganese dioxide powders.

4) Acid washing and activating: the crude catalyst prepared in 3) was mixed with acid solution. The acid solution was prepared by mixing hydrochloric acid, $SnCl_4.5H_2O$, acetic acid, and water according to a molar ratio 1:1:2:10. A weight ratio of the catalyst to the acid solution is 10:50. Alternating between ultrasound and microwave to perform acid washing of the catalyst for 30 min so as to activate the crude catalyst and form pores: the catalyst was washed under ultrasonic condition for 3 min, then the acid washing was switched to microwave radiation, and radiated for 1 min, and the above process was repeated. The ultrasonic power was 25 KHz, and the microwave power was 2 W.

5) Washing and drying: the catalyst in 4) was washed using water until pH of washing solution was constant. The catalyst was placed in the drying oven and dried for 12 hrs in air at 105° C. to remove molecular water in the catalyst and yield the supported catalyst used in catalytic ozonation.

Example 2

A method for preparing a supported catalyst for heterogeneous catalytic ozonation comprises the following steps:

1) Ingredient: attapulgite, lithium-manganese spinel (Li—Mn spinel), and manganese dioxide powders were mixed uniformly to form mixed raw material. Water was added to the mixed raw material, and a weight ratio of the attapulgite to the Li—Mn spinel to the manganese dioxide powders and to the water is 100:2:1:85. The mixed raw material and water were stirred and mixed for 10 min to yield a reaction mixture. Particle size of the Li—Mn spinel is 125 nm.

The attapulgite was evenly mixed with the commercial manganese dioxide, or an uneven mixing results in bad quality and uneven performance of the supported catalyst.

Water was used as a binder, so that no waste gas was produced in the calcining process, thereby protecting the environment. However, when the weight ratio of the binder (water) is higher than or lower than the range above, the catalyst is difficult to be shaped or granulated.

When the amount of the manganese dioxide powders is out of the range above, the catalyst is difficult to be shaped or granulated as well, meanwhile, the mechanical strength thereof is low.

2) Pelleting and drying: the reaction mixture in 1) was fed to a pelletizer to prepare spherical particles. A diameter of the spherical particles was 3.5 mm. The spherical particles were moved to a drying oven and dried for 1.5 hrs at 105° C. in air to yield a precursor.

3) Calcining and drying: the precursor prepared in 2) was heated to 700° C. at a rate of 200° C./h in a muffle furnace, and the precursor was calcined for 13 hrs to yield a catalyst with certain mechanical strength.

The two objectives of the calcining are: 1. removing molecular water and crystal water in the precursor and improving the strength of the catalyst to form porous catalyst pellet; 2. activating the commercial manganese dioxide to catalytic manganese dioxide powders.

4) Acid washing and activating: the crude catalyst prepared in 3) was mixed with acid solution. The acid solution was prepared by mixing hydrochloric acid, $SnCl_4 \cdot 5H_2O$, acetic acid, and water according to a molar ratio 1:1:3:12.5. A weight ratio of the catalyst to the acid solution is 10:50. Alternating between ultrasound and microwave to perform acid washing of the catalyst for 30 min so as to activate the crude catalyst and form pores: the catalyst was washed under ultrasonic condition for 4 min, then the acid washing was switched to microwave radiation, and radiated for 1.5 min, and the above process was repeated. The ultrasonic power was 52 KHz, and the microwave power was 26 W.

5) Washing and drying: the catalyst in 4) was washed using water until pH of washing solution was constant. The catalyst was placed in the drying oven and dried for 12 hrs in air at 105° C. to remove molecular water in the catalyst and yield the supported catalyst used in catalytic ozonation.

Example 3

A method for preparing a supported catalyst for heterogeneous catalytic ozonation comprises the following steps:

1) Ingredient: attapulgite, lithium-manganese spinel (Li—Mn spinel), and manganese dioxide powders were mixed uniformly to form mixed raw material. Water was added to the mixed raw material, and a weight ratio of the attapulgite to the Li—Mn spinel to the manganese dioxide powders and to the water is 100:3:20:90. The mixed raw material and water were stirred and mixed for 15 min to yield a reaction mixture. Particle size of the Li—Mn spinel is 200 nm.

The attapulgite was evenly mixed with the commercial manganese dioxide, or an uneven mixing results in bad quality and uneven performance of the supported catalyst.

Water was used as a binder, so that no waste gas was produced in the calcining process, thereby protecting the environment. However, when the weight ratio of the binder (water) is higher than or lower than the range above, the catalyst is difficult to be shaped or granulated.

When the amount of the manganese dioxide powders is out of the range above, the catalyst is difficult to be shaped or granulated as well, meanwhile, the mechanical strength thereof is low.

2) Pelleting and drying: the reaction mixture in 1) was fed to a pelletizer to prepare spherical particles. A diameter of the spherical particles was 4 mm. The spherical particles were moved to a drying oven and dried for 2.5 hrs at 105° C. in air to yield a precursor.

3) Calcining and drying: the precursor prepared in 2) was heated to 1000° C. at a rate of 200° C./h in a muffle furnace, and the precursor was calcined for 24 hrs to yield a crude catalyst with certain mechanical strength.

The two objectives of the calcining are: 1. removing molecular water and crystal water in the precursor and improving the strength of the catalyst to form porous catalyst pellet; 2. activating the commercial manganese dioxide to catalytic manganese dioxide powders.

4) Acid washing and activating: the crude catalyst prepared in 3) was mixed with acid solution. The acid solution was prepared by mixing hydrochloric acid, $SnCl_4 \cdot 5H_2O$, acetic acid, and water according to a molar ratio 1:1:4:15. A weight ratio of the catalyst to the acid solution is 10:50. Alternating between ultrasound and microwave to perform acid washing of the catalyst for 30 min so as to activate the crude catalyst and form pores: the catalyst was washed under ultrasonic condition for 5 min, then the acid washing was switched to microwave radiation, and radiated for 2 min, and the above process was repeated. The ultrasonic power was 80 KHz, and the microwave power was 50 W.

5) Washing and drying: the catalyst in 4) was washed using water until pH of washing solution was constant. The catalyst was placed in the drying oven and dried for 12 hrs in air at 105° C. to remove molecular water in the catalyst and yield the supported catalyst used in catalytic ozonation.

Example 4

A method for preparing a supported catalyst for heterogeneous catalytic ozonation comprises the following steps:

1) Ingredient: attapulgite, lithium-manganese spinel (Li—Mn spinel), and manganese dioxide powders were mixed uniformly to form mixed raw material. Water was added to the mixed raw material, and a weight ratio of the attapulgite to the Li—Mn spinel to the manganese dioxide powders and to the water is 100:2:20:85. The mixed raw material and water were stirred and mixed for 15 min to yield a reaction mixture. Particle size of the Li—Mn spinel is 100 nm.

The attapulgite was evenly mixed with the commercial manganese dioxide, or an uneven mixing results in bad quality and uneven performance of the supported catalyst.

Water was used as a binder, so that no waste gas was produced in the calcining process, thereby protecting the environment. However, when the weight ratio of the binder (water) is higher than or lower than the range above, the catalyst is difficult to be shaped or granulated.

When the amount of the manganese dioxide powders is out of the range above, the catalyst is difficult to be shaped or granulated as well, meanwhile, the mechanical strength thereof is low.

2) Pelleting and drying: the reaction mixture in 1) was fed in a pelletizer to prepare hollow cylindrical particles. An outer diameter of the hollow cylindrical particles was 4 mm, and an inner diameter of the hollow cylindrical particles was 1 mm. A cylindrical core was filled in the hollow cylindrical particles, and the hollow cylindrical particles was moved to a drying oven and dried for 2 hrs at 105° C. in air to yield a precursor. The cylindrical core is a mixture of titanium dioxide, cerium oxide, and attapulgite, and a weight ratio of the titanium dioxide to the cerium oxide and the attapulgite is 3:1:6. The cylindrical core is prepared by calcining the mixture of the titanium dioxide, the cerium oxide, and the attapulgite.

3) Calcining and drying: the precursor prepared in 2) was heated to 1000° C. at a rate of 200° C./h in a muffle furnace, and the precursor was calcined for 2 hrs to yield a catalyst with certain mechanical strength.

The two objectives of the calcining are: 1. removing molecular water and crystal water in the precursor and improving the strength of the catalyst to form porous catalyst pellet; 2. activating the commercial manganese dioxide to catalytic manganese dioxide powders;

4) Acid washing and activating: the crude catalyst prepared in 3) was mixed with acid solution. The acid solution was prepared by mixing hydrochloric acid, $SnCl_4 \cdot 5H_2O$, acetic acid, and water according to a molar ratio 1:1:2.5:12. A weight ratio of the catalyst to the acid solution is 10:50. Alternating between ultrasound and microwave to perform acid washing of the catalyst for 30 min so as to activate the crude catalyst and form pores: the catalyst was washed under ultrasonic condition for 4 min, then the acid washing was switched to microwave radiation, and radiated for 1 min, and the above process was repeated. The ultrasonic power was 60 KHz, and the microwave power was 20 W.

5) Washing and drying: the catalyst in 4) was washed using water until pH of washing solution was constant. The catalyst was placed in the drying oven and dried for 12 hrs in air at 105° C. to remove molecular water in the catalyst and yield the supported catalyst used in catalytic ozonation.

Figure 2:
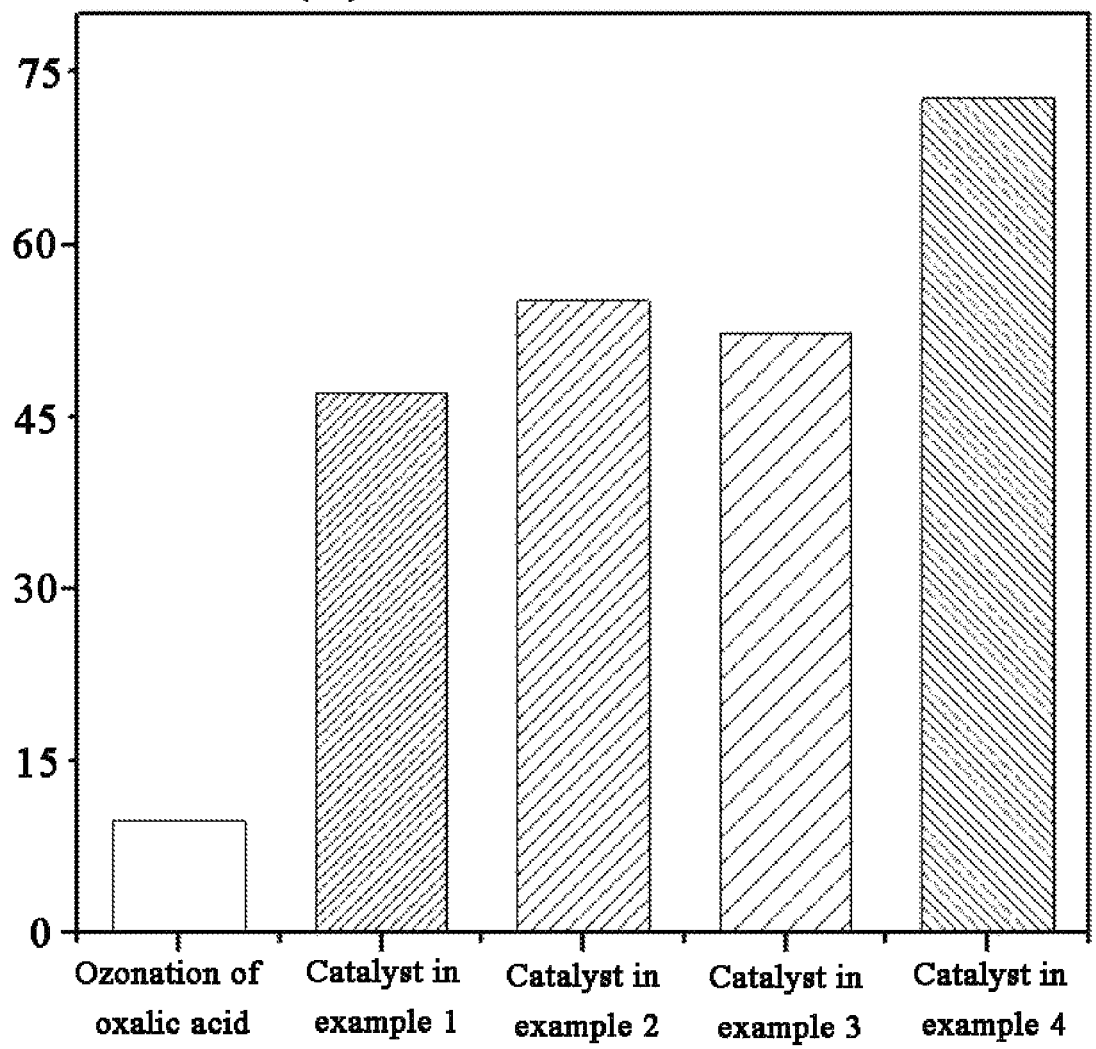
FIG. 2 is a diagram showing catalytic ozonation using different catalysts according to one embodiment of the invention.

Simulation experiment of pollutant degradation by catalytic ozonation using oxalic acid Simulated wastewater was prepared using oxalic acid as the organic matter, and was processed using the catalysts prepared in the four examples; simulated wastewater which is not processed using any catalyst is used as a comparison; where, concentration of oxalic acid is 250 mg/L, volume of reaction mixture is 1 L, solvent pH=3, ozone dosage is 14.19±0.37 mg/L, flow velocity of gas is 400 mL/min, and reaction time is 30 min. The catalytic ozonation results using different catalysts are shown in FIG. 2.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing a catalyst, the method comprising:
   1) uniformly mixing attapulgite, lithium-manganese (Li—Mn) spinel, and manganese dioxide powders to form mixed raw material; adding water to the mixed raw material, wherein, a weight ratio of the attapulgite to the Li—Mn spinel to the manganese dioxide powders and to the water is 100:1-3:1-20:80-90; stirring and mixing the mixed raw material and the water for between 5 and 15 min to yield a reaction mixture;
   2) feeding the reaction mixture in 1) to a pelletizer to prepare spherical particles or hollow cylindrical particles, a diameter of the spherical particles being between 3 and 4 mm; drying the spherical particles or the hollow cylindrical particles in a drying oven for between 0.5 and 2.5 hr(s) at 105° C. in air to yield a precursor;
   3) heating the precursor prepared in 2) to a temperature between 400 and 1000° C. at a rate of 200° C./h in a muffle furnace, and calcining the precursor for between 2 and 24 hrs to yield a crude catalyst;
   4) mixing the crude catalyst prepared in 3) with an acid solution, a weight ratio of the catalyst to the acid solution being 10:50; alternating between ultrasound and microwave to wash the crude catalyst for 30 min; and
   5) washing the crude catalyst from 4) using water until a pH value of a resulting washing solution is constant; and drying the crude catalyst for 12 hrs in air at 105° C. to yield the catalyst.

2. The method of claim 1, wherein
   in 1), the attapulgite, the Li—Mn spinel, the manganese dioxide powders, and the water are uniformly mixed and stirred for 15 min to form the mixed raw material, and the weight ratio of the attapulgite to the Li—Mn spinel to the manganese dioxide powders and to the water is 100:2:20:85;
   in 2), the diameter of the spherical particles is 4 mm; the spherical particles are dried for 2 hrs at 105° C. in air to yield the precursor; and
   in 3), the precursor prepared in 2) is heated to 1000° C. at a rate of 200° C./h in the muffle furnace, and is calcined for 2 hrs.

3. The method of claim 1, wherein a particle size of the Li—Mn spinel is between 50 and 200 nm.

4. The method of claim 2, wherein a particle size of the Li—Mn spinel is between 50 and 200 nm.

5. The method of claim 1, wherein in 2), an inner diameter of the hollow cylindrical particles is 1 mm, and an outer diameter of the hollow cylindrical particles is 4 mm; a cylindrical core is filled with the hollow cylindrical particles, and the cylindrical particles are dried for 2 hrs at 105° C. in air to yield the precursor.

6. The method of claim 1, wherein the acid solution comprises hydrochloric acid, $SnCl_4 \cdot 5H_2O$, acetic acid, and water, and a molar ratio thereof is 1:1:2-4:10-15.

7. The method of claim 1, wherein the crude catalyst is washed under ultrasonic condition for between 3 and 5 min, then washed under microwave radiation for between 1 and 2 min, and repeat above washing steps; an ultrasonic power is between 25 and 80 KHz, and a microwave power is between 2 and 50 W.

* * * * *